Sept. 25, 1962 I. L. JOY 3,055,210
COUPLING LIQUID APPARATUS FOR ULTRASONIC TESTING
Filed Feb. 13, 1958 3 Sheets-Sheet 1

INVENTOR.
Ivan L. Joy
BY Mann, Brown & McWilliams
ATTORNEYS

Sept. 25, 1962    I. L. JOY    3,055,210
COUPLING LIQUID APPARATUS FOR ULTRASONIC TESTING
Filed Feb. 13, 1958    3 Sheets-Sheet 2

INVENTOR.
Ivan L. Joy
By Mann, Brown & McWilliams
ATTORNEYS

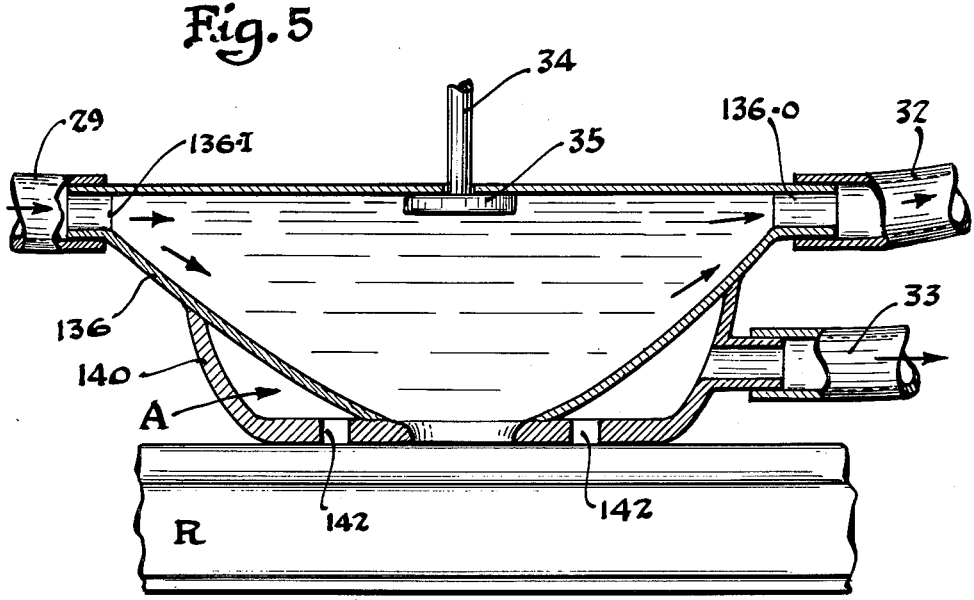
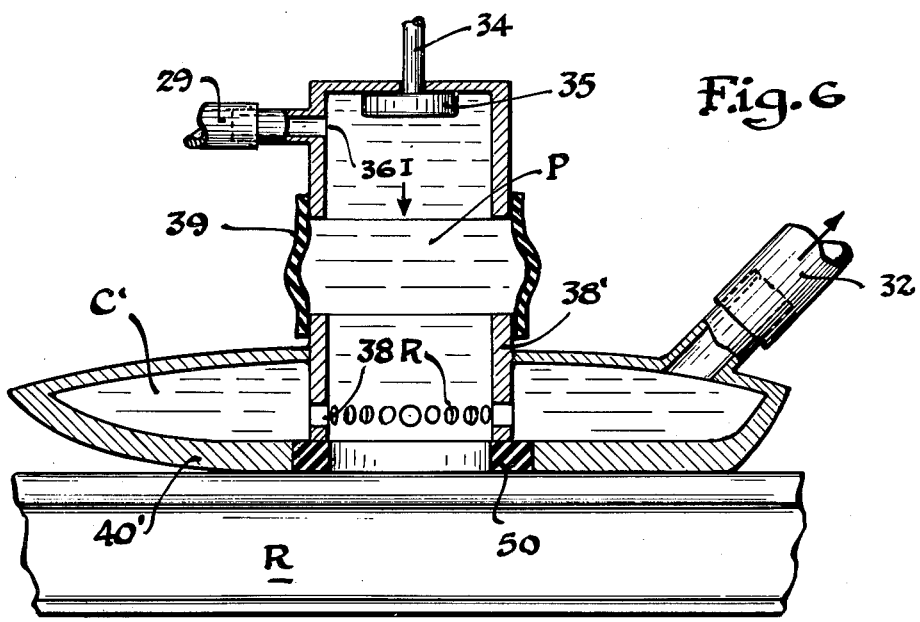

United States Patent Office 3,055,210
Patented Sept. 25, 1962

3,055,210
COUPLING LIQUID APPARATUS FOR
ULTRASONIC TESTING
Ivan L. Joy, 1616 W. Dudley Road, Topeka, Kans.
Filed Feb. 13, 1958, Ser. No. 715,002
8 Claims. (Cl. 73—71.5)

This invention relates to an improved arrangement for reclaiming coupling liquid that is supplied as a solid stream flowing continuously between spaced apart facing surfaces of an ultrasonic wave emitter and an object under test and, more particularly, is concerned with coupling liquid arrangements employed in rail-testing operations wherein the emitter is supported from a carriage of a suitable ultrasonic detector car and is continuously progressed along longitudinally successive surface portions of a track rail.

The present invention offers important improvements over similar types of coupling devices such as are shown in my copending application, Serial No. 654,941, filed April 24, 1957, now Patent No. 2,992,553, the disclosure of which, to the extent it is not inconsistent herewith, is specifically incorporated herein by reference.

In applications such as the progressive testing of rail, a stream of coupling liquid, usually water, provided between the facing surfaces of the ultrasonic wave emitter and the rail, has proven successful in efficiently coupling ultrasound therebetween; however, serious practical limitations have arisen in attempting to provide, carry, and replenish the large amounts of water consumed. Water-reclaiming procedures such as are described in my above-mentioned copending application have been employed with varying degrees of success, but in every case a residual film of water has remained on the rail. Assuming rail has a head width on the order of 2½″, a residual film of 1/64″ thickness amounts to about 10 gallons per mile.

The principal object of the present invention is to provide an improved coupling liquid apparatus having an efficient reclaiming system for minimizing the residual film-like deposit of coupling liquid.

Briefly, this is accomplished by providing a coupling apparatus having a liquid flow passage therein and including separate suction lines, one a liquid-suction line for encouraging liquid flow through said passage and the other an air-suction line opening towards the object under test at a region thereof bordering the flow passage for setting up inflowing air streams at the surface of the object to develop a film-sweeping action and thereby minimize loss of liquid.

Other objects and advantages will become apparent during the course of the following description.

In the accompanying drawings forming a part of this specification and in which like numerals are employed to designate like parts throughout the same—

FIG. 5 is a longitudinal sectional view of still another form of coupling apparatus in accordance with the present invention; and FIG. 6 is a longitudinal sectional view of a preferred ultrasonic coupling apparatus having but a single vacuum line.

Figure 1:
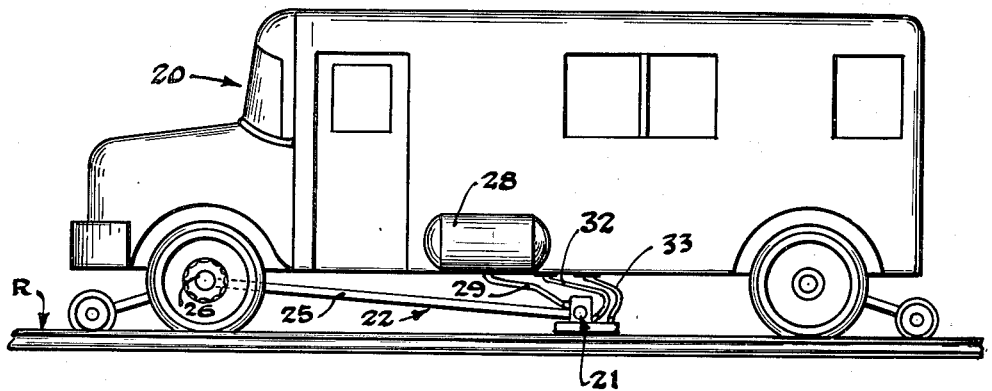
FIG. 1 is a side elevational view of a typical ultrasonic rail detector car continuously progressing the ultrasonic coupling apparatus of the invention along a section of track under inspection.

For purposes of disclosure, the invention is illustrated in the form in which it is embodied for use in the continuous progressive ultrasonic testing of rail, and in FIG. 1 there is shown a typical ultrasonic rail detector car 20 moving along a trail rail R and dragging an ultrasonic coupling device 21 along the rail for continuously, progressively testing successive lengthwise portions of the rail. The car includes a suspension carriage arrangement 22, which may be of the general form shown in my copending patent application, Serial No. 539,129, filed October 7, 1955, the disclosure of which is hereby specifically incorporated by reference.

Briefly, such a suspension system may include a pair of rearwardly diverging arms 25 pivotally supported at their forward ends for vertical and transverse swinging movement. For example, they preferably are mounted about the front axle 26 of the car and are arranged to diverge rearwardly for transversely spaced apart connection to separate ones of a pair of spring-loaded rods (not shown) that form a telescoping rod arrangement that extends transversely of the rails and carries ultrasonic search units in working relationship with the track rails. It will be apparent that other carriage arrangements may be employed for dragging the coupling apparatus 21 along the rail. For completeness, the car is shown as including a coupling liquid reservoir 28 having a coupling liquid supply line 29 for supplying coupling liquid, which usually is water, to the coupling device 21 to provide a solid stream of coupling liquid between the ultrasonic emitter and the rail. According to the invention, a pair of suction lines 32 and 33 reclaim the coupling liquid.

Figure 2:
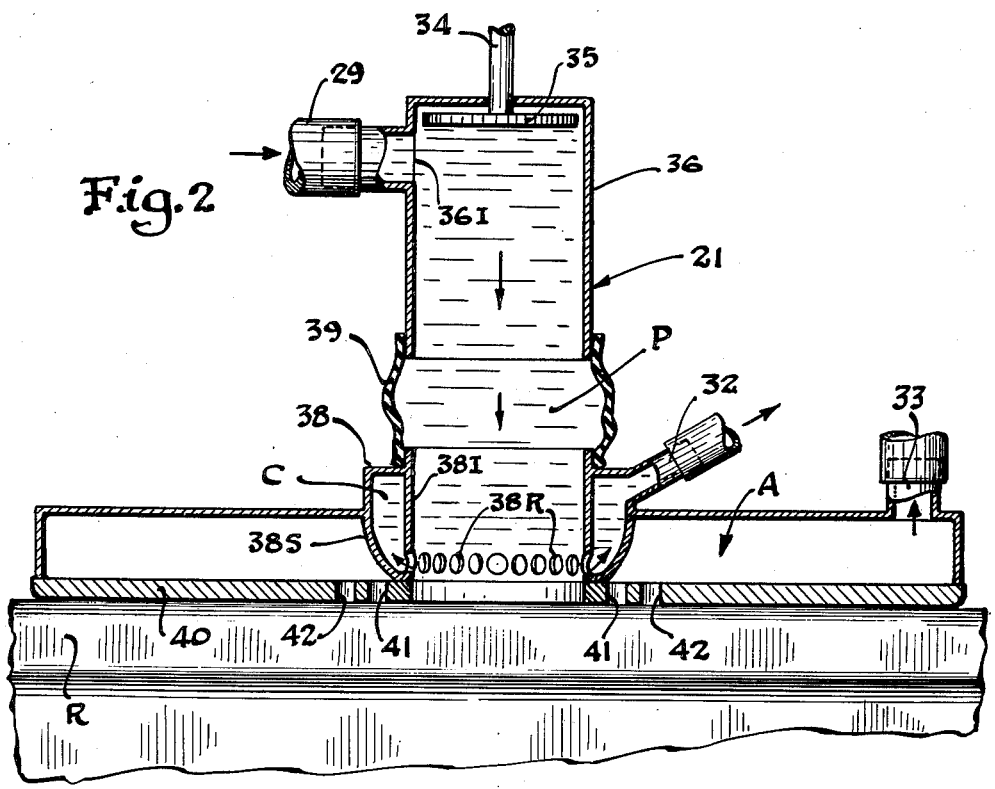
FIG. 2 is a longitudinal sectional view through a preferred form of ultrasonic coupling apparatus.
Figure 4:
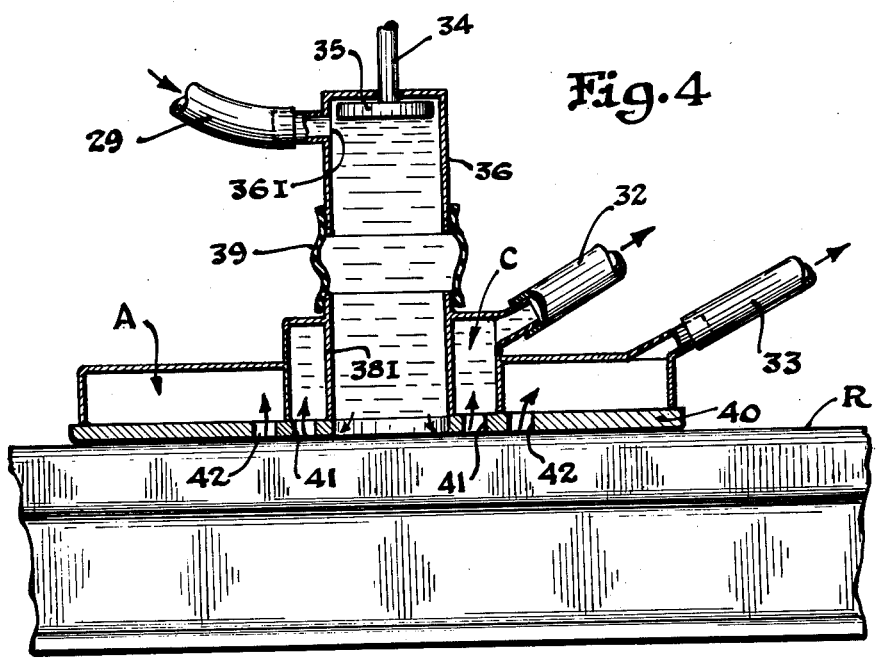
FIG. 4 is a longitudinal sectional view through an alternative embodiment of the coupling apparatus of the present invention.

In the forms of the invention illustrated in FIGS. 2 and 4 for purposes of disclosure, a solid flow stream is set up along a path extending from the emitter towards the rail surface so that the ultrasonic signals move downstream through the liquid path in travelling from the emitter to the rail surface and move upstream in returning from the rail surface towards the emitter. Also, for purposes of disclosure, the invention is described as applied to coupling ultrasonic signals through the top surface of the rail since this application involves a more severe gas-bubble problem, but it will be apparent that the principles are also applicable to the coupling of ultrasonic signals through the side surfaces of the rail.

Figure 3:
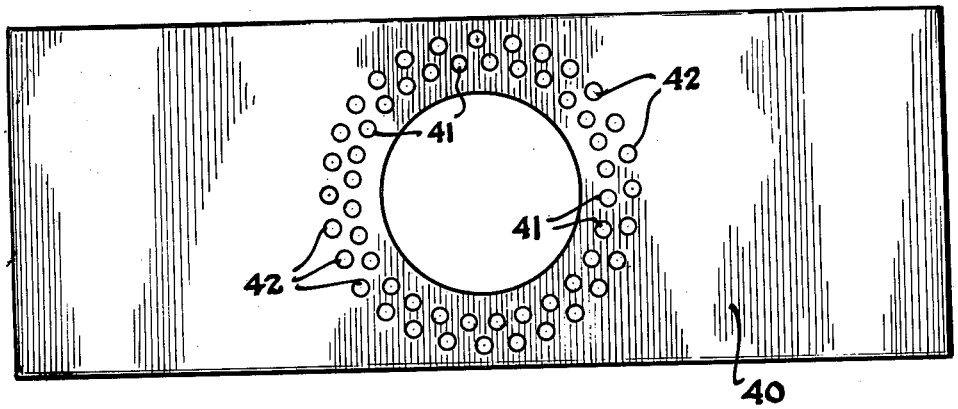
FIG. 3 is a bottom plan view of the rail shoe of the apparatus of FIG. 2.

The ultrasonic coupling apparatus illustrated generally at 21 in FIG. 1 is shown in more detail in FIGS. 2 and 3 and is arranged to develop a vertically downwardly directed flow stream through the space that exists between the facing surface of the rail R and the emitter 35 to provide a direct ultrasonic path therebetween. In FIG. 2, the emitter 35 is represented as a piezoelectric crystal that is actuated by high-frequency electrical signals supplied through a coaxial cable 34. The crystal 35 is mounted within the closed upper end of a rigid holder tube 36, with the tube having a coupling liquid inlet 36I located approximately at the elevation of the emitting face of the crystal and directing a stream of coupling liquid across this emitting face to continuously sweep it free of gas bubbles that may tend to collect there. After sweeping the face of the crystal, the incoming liquid flows vertically downwardly through the holder tube as a solid stream and at a rate sufficient to prevent gas bubbles from rising therein.

In the preferred arrangement for rail testing, the lower end of the holder tube terminates well above the rail surface and communicates with a rigid tube 38 through an intermediate section 39 of flexible tubing material, such as rubber, with the tube 38 being joined to an open-centered, rail-engaging shoe 40 to form a flow passage P extending the full distance between the facing surfaces of the rail and the emitter. The tube 38 is in the form of a chambered skirt assembly having an inner skirt 38I forming the lower portion of the coupling-liquid flow passage and a surrounding outer skirt 38S rigid with and spaced outwardly of the inner skirt to form therebetween an enclosed liquid-collecting chamber C that is connected to the liquid-suction line 32. In this preferred embodiment, the chamber C communicates with the flow passage P at a region slightly above the place thereof bounded by the rail surface, such communication being effected through a plurality of radially extending ports 38R provided in the inner skirt 38I. The bulk of the water, therefore, flows through these ports 38R to the chamber C for reclaiming in the coupling-liquid suction line 32; and experience indicates that the flow pattern of this device effectively maintains a continuous ultrasonic coupling path between the facing surfaces of the emitter and rail, even though relatively little water flows between the adjacent surfaces of the rail shoe and the rail.

As indicated in FIG. 2, the shoe 40 is formed with a chamber A that surrounds the liquid-collecting chamber C and communicates with the flow passage P through inner and outer annular sets of ports 41 and 42, respectively, that open from the shoe chamber towards the surface of the rail. The shoe chamber A is connected to an air-suction line 33, and since relatively little water travels through this line and saturation is thereby avoided, the air therein moves very rapidly and continuously draws air between the adjacent surfaces of the shoe and rail at a rate sufficient to develop an efficient air-sweeping action and minimize the residual film of liquid deposited on the rail surface.

With the above-described arrangement, wherein the emitter is mounted over the top surface of the rail and a solid stream of water serves as the couplant and flows downwardly through the flow passage, the flow rate of such stream should be on the order of two feet per second in order to overcome the tendency of gas bubbles to move upwardly through the flow passage. In this way the bubbles are carried away and do not appear as "hash" in the reflected signals. Assuming a flow passage of one inch diameter, a flow rate of approximately five gallons per minute is required to maintain the desired stream velocity. Thus, the reclaiming system must be able to handle efficiently the collection, return, and cleansing of water at the rate of five gallons per minute, while continuously air-sweeping the rail surface to inhibit the deposit of a residual film of water thereon. The arrangement of FIG. 2 fulfills this need.

An alternative embodiment is shown in FIG. 4 wherein the water returned through the suction line 32 from the couplant chamber C flows around the lower end of the skirt 38I and upwardly through the inner annular set of holes 41 while only the outer set of holes 42 feeds the air-suction chamber A formed in the shoe 40. The construction is otherwise identical to that of FIG. 2.

It will be apparent to those skilled in this art that the double suction line arrangement of the invention, which utilizes one line primarily for air to develop a surface-sweeping action and produce an efficient pooling of coupling liquid and the other line primarily for liquid to maintain the desired flow rate, is applicable to coupling devices arranged to produce other flow patterns, such, for example, as coupling streams that flow transversely of the direction of the ultrasound.

An arrangement utilizing such a transverse flow pattern with separate suction lines for air and liquid is shown in FIG. 5 as including a rigid-walled, bowl-shaped crystal holder 136 and a chambered rail-engaging shoe 140. The holder 136 and the shoe 140 have registering openings in their bottom walls for enabling the coupling liquid to establish direct contact with the rail surface. The holder 136 has a generally horizontal inlet 136I for coupling liquid supplied through line 29 and a generally horizontal outlet 136o for returning coupling liquid through the liquid-suction line 32, and thus the holder 136 provides a flow passage through which coupling liquid flows in a direction generally transverse of the direction of the ultrasonic path therein. The shoe 140 is arranged to define a chamber A that opens towards the rail through an annular ring of holes 142 and communicates with the air-suction line 33 for establishing an air-sweeping action at the surface of the rail that serves to pick up any water that is deposited on the surface of the rail as the apparatus is progressed therealong.

The use of a coupling apparatus having transverse coupling liquid flow has a number of important advantages in that the transverse flow does not affect the phase relationships of the ultrasonic testing apparatus, in that the transverse flow minimizes turbulence and associated "hash" and allows for a more effective sweeping and removal of air bubbles from the ultrasonic path, and in that the transverse flow requires somewhat lower rates of flow.

If desired, the rigid-walled, bowl-shaped holder 136 of FIG. 5 may be modified to include a flexible skirt to allow for free rail-following movement of the shoe 140 and of the lower part of the holder 136. Such a modification is believed to be obvious in the light of the showings in FIGS. 2 and 4.

While, at present, for general-purpose rail testing or similar testing operations the use of separate liquid and air-suction lines is very important for effectively removing or minimizing the residual film of liquid referred to hereinbefore, there are certain instances where, due to the ready availability of a plentiful supply of coupling liquid, some loss of coupling liquid can be tolerated. In such instances, a coupling apparatus such as shown in FIG. 6 may be employed. This coupling apparatus is similar to the arrangement of FIG. 2 as respects the dimensions and flow rate of the liquid column in the flow passage P. Thus, the coupling apparatus of FIG. 6 includes a rigid holder tube 36 communicating with a rigid base tube 38' through an intermediate section 39 of flexible tubing such as rubber. The tube 38' extends through a chambered shoe 40' that is provided with a chamber C' in surrounding, communicating relationship with the flow passage P through an annular arrangement of radially extending ports 38R. A sealing ring 50, in the form of a closed loop, is secured around the bottom end of the tube 38' for substantially liquid-tight contact with the surface of the object under test. As shown, this sealing ring 50 may also be bonded to the wear plate of the shoe for stabilizing the relative positioning of the shoe 40' and tube 38', or, as will be apparent, these parts may be secured directly to each other in a manner similar to that of FIG. 2 except that in this latter instance, the parts should be formed to provide an annular mounting recess for the sealing ring.

The sealing ring, as shown, is of solid rubber or other rubber-like material, and it will be apparent that other forms of closed-loop sealing arrangements may be provided around the bottom end of tube 38'. Where wear conditions permit, a ring of inflated hollow tubing can be employed.

In the arrangement of FIG. 6, the water or other coupling liquid flows in at 36I, down the passage P, through the ports 38R and Chamber C', and is returned by suction in line 32. Such leakage as occurs around sealing ring 50 would not be reclaimed, and where greater liquid loss can be tolerated, even a metal-to-metal engagement may be relied upon for sealing.

It will be apparent that a similar type of sealing ring arrangement may be provided for the FIG. 2 arrangement.

It should be understood that the description of the preferred form of the invention is for the purpose of complying with section 112, Title 35, of the U.S. Code and that the claims should be construed as broadly as prior art will permit.

I claim:

1. In ultrasonic testing equipment, apparatus for transmitting elastic vibrations between an elastic wave emitter and an object under test, said apparatus including hollow holder structure housing said emitter and an object-engaging shoe joined to said holder structure to provide in said apparatus a flow passage disposed between said emitter and said object and extending through said holder and said shoe, a liquid inlet opening into said holder structure at a point spaced from said object, a liquid suction line communicating with said passage at a point spaced from said emitter and said inlet, means for supplying coupling liquid through said inlet to form a solid continuous stream of coupling liquid that flows across said emitter, fills said flow passage and flows toward said liquid suction line, said shoe providing a chamber arranged in surrounding relation about said passage and having air openings spaced about said passage at a region thereof adjacent said object and facing said object, and an air suction line leading from said chamber for drawing air between said object and said shoe to sweep into said chamber any liquid from said passage escaping between said object and said shoe.

2. In ultrasonic testing equipment, apparatus for transmitting elastic vibrations between an elastic wave emitter and an object under test, said apparatus including hollow holder structure housing said emitter and an object-engaging shoe joined to said holder structure to provide in said apparatus a flow passage disposed between said emitter and said object and extending through said holder and said shoe, a liquid inlet opening into said holder structure at a point spaced from said object, said shoe providing a liquid reclaiming chamber arranged in surrounding relation about said passage and communicating therewith at a region adjacent said object and providing an air chamber arranged in surrounding relation about said passage and having air openings spaced about said passage and facing said object, means for supplying coupling liquid through said inlet to form a solid continuous stream of coupling liquid filling said passage and flowing from said emitter toward said object, a liquid suction line communicating with said liquid chamber, and an air suction line communicating with said air chamber for drawing air between said object and said shoe to sweep into said air chamber any liquid from said passage escaping between said object and said shoe.

3. In ultrasonic testing equipment, apparatus for transmitting elastic vibrations between an elastic wave emitter and an object under test, said apparatus including hollow holder structure housing said emitter and an object-engaging shoe joined to said holder structure to provide in said apparatus a flow passage disposed between said emitter and said object and extending through said holder and said shoe, said shoe having inner and outer generally annular chambers surrounding said passage at the end of said flow passage adjacent said object, said shoe having radial ports between said inner chamber and said flow passage and axial ports opening from said outer chamber towards said object, a liquid-suction line to said inner chamber, an air-suction line to said outer chamber, and means including an inlet opening into said hollow supporting structure adjacent said emitter for supplying coupling liquid through said inlet to form a solid continuous stream of coupling liquid filling said passage and flowing from said emitter towards said object.

4. In ultrasonic testing equipment, apparatus for transmitting elastic vibrations between an elastic wave emitter and a rail under test, said apparatus including hollow holder structure housing said emitter and a rail-engaging shoe joined to said holder structure to provide in said apparatus a flow passage disposed between said emitter and said rail and extending through said holder and said shoe, a liquid inlet opening into said holder structure at a point spaced from said rail, a liquid suction line communicating with said passage at a point spaced from said element and from said inlet, means for supplying coupling liquid through said inlet to form a solid continuous stream of coupling liquid that flows across said element, fills said flow passage and flows toward said liquid suction line, said shoe providing a chamber arranged in surrounding relation about said passage and having air openings spaced about said passage at a region thereof adjacent said rail and facing said rail, and an air suction leading from said chamber for drawing air between said rail and said shoe to sweep into said chamber any liquid from said passage escaping between said rail and said shoe.

5. The arrangement of claim 4 wherein said apparatus includes a flexible tubular section disposed between and interconnecting adjacent portions of said holder structure and said shoe for accommodating relative movement between said holder structure and said shoe to permit said shoe to move with respect to the rail without disturbing the orientation of the emitter housed in said holder structure.

6. The arrangement of claim 1 wherein said liquid suction line communicates with said flow passage at a point thereof remote from said object to establish a coupling liquid stream flowing generally transversely of the direction in which said emitter and said object are spaced apart.

7. In ultrasonic testing equipment, apparatus for transmitting elastic vibrations between an elastic wave emitter and an object under test, said apparatus including hollow holder structure housing said emitter and an object-engaging shoe joined to said holder structure to provide in said apparatus a flow passage disposed between said emitter and said object and extending through said holder and said shoe, a liquid inlet opening into said holder structure at a point spaced from said object, a liquid suction line communicating with said passage at a point spaced from said emitter and said inlet, and means for supplying coupling liquid through said inlet to form a solid continuous stream of coupling liquid that flows across said emitter, fills said flow passage and flows toward said liquid suction line, said holder structure and said shoe providing liquid-confining wall means bordering and defining said flow passage and including a flexible tubular section disposed between and interconnecting adjacent portions of said holder structure and said shoe for accommodating relative movement between said holder structure and said shoe to permit said shoe to move with respect to the object without disturbing the orientation of the emitter housed in said holder structure.

8. In ultrasonic testing equipment, apparatus for transmitting elastic vibrations between an elastic wave emitter and an object under test, said apparatus including hollow holder structure housing said emitter and an object-engaging shoe joined to said holder structure to provide in said apparatus a flow passage disposed between said emitter and said object and extending through said holder and said shoe along a direction in which ultrasonic energy is to travel between said emitter and said object, and said flow passage having a major cross sectional dimension on the order of one inch and having a height dimension substantially greater than said major cross sectional dimension, said shoe having a liquid-collecting chamber communicating with said flow passage chamber at a region thereof adjacent the object, a liquid suction line connected to said liquid-collecting chamber, and means including a line connected to said flow passage chamber at a region thereof adjacent said emitter for supplying low viscosity ultrasonic energy-transmitting coupling liquid into said flow passage chamber to produce a solid stream of bubble free coupling liquid flowing vertically downwardly through said flow passage chamber and into said liquid-collecting chamber at a flow stream rate through said passage greater than the rate of rise of gas bubbles through said liquid for continuously sweeping away gas bubbles attempting to enter said flow passage chamber at the end thereof adjacent the object.

References Cited in the file of this patent

UNITED STATES PATENTS

| | | |
|---|---|---|
| 2,592,134 | Firestone | Apr. 8, 1952 |
| 2,751,783 | Erdman | June 26, 1956 |
| 2,873,391 | Schulze | Feb. 10, 1959 |

FOREIGN PATENTS

| | | |
|---|---|---|
| 894,737 | France | Mar. 20, 1944 |